United States Patent [19]

Schnoor et al.

[11] Patent Number: 5,667,083

[45] Date of Patent: Sep. 16, 1997

[54] DUAL MATRIX MEDIA STORAGE UNIT

[76] Inventors: Richard J. Schnoor, 17575 Bridle Ct., Jupiter, Fla. 33478; John A. Schnoor, 275 E. Central Pkwy., Altamonte, Fla. 32701

[21] Appl. No.: 444,007

[22] Filed: May 18, 1995

[51] Int. Cl.$^6$ ............................................. A47G 19/08
[52] U.S. Cl. .............. 211/41.12; 211/113; 206/387.15; D6/407; D6/629
[58] Field of Search .................... 211/40, 41, 113, 211/118; 206/308.1, 387.1; D6/407, 626, 629, 630

[56] References Cited

U.S. PATENT DOCUMENTS

| D. 244,499 | 5/1977 | Parfitt | D6/407 |
|---|---|---|---|
| 3,702,132 | 11/1972 | Fites et al. | 206/387.15 |
| 3,969,007 | 7/1976 | Lowry | 206/387.15 |
| 4,645,075 | 2/1987 | Van der Lely | 206/387.15 |
| 4,778,047 | 10/1988 | Lay | 206/308.1 X |
| 4,867,306 | 9/1989 | Factor | 206/309 |
| 4,951,826 | 8/1990 | Tompkins | 211/40 |
| 5,027,955 | 7/1991 | Shoemaker, Jr. et al. | 211/40 |
| 5,040,687 | 8/1991 | Whittineton | 211/40 |
| 5,078,270 | 1/1992 | Campbell | 206/444 |
| 5,094,414 | 3/1992 | Eddy, Jr. | 211/113 X |
| 5,097,946 | 3/1992 | Emrich | 206/45.11 |
| 5,105,952 | 4/1992 | Krattiger | 211/41 |
| 5,154,291 | 10/1992 | Sur | 206/440 |
| 5,170,893 | 12/1992 | Smith | 211/40 |
| 5,188,230 | 2/1993 | O'Brien et al. | 206/312 |
| 5,191,983 | 3/1993 | Hardy | 206/308.1 X |

*Primary Examiner*—Leslie A. Braun
*Assistant Examiner*—Sandra Snapp
*Attorney, Agent, or Firm*—Pennie & Edmonds LLP

[57] ABSTRACT

A storage unit for storing recorded media that has a dual media storage row. The media storage unit has a support beam having means for hanging. The storage unit allows media to be stored in its original labeled container so that the face of the media container is exposed to outside view allowing the user to quickly identify the medium being searched for. The storage unit comprises a series of storage rows that are interfitted together. The user may add or remove storage rows to the storage unit to increase or decrease the storage capacity of the storage unit.

17 Claims, 4 Drawing Sheets

DUAL MATRIX MEDIA STORAGE UNIT

TECHNICAL FIELD

This invention relates to the storage of recorded media, and more particularly, storage devices for recorded media.

BACKGROUND ART

Media storage units provide means for storing recorded media such as compact disks (CDs), audio cassette tapes, video cassette tapes, floppy disks, and the like. Most storage units provide a vertical or horizontal stacking method of the media wherein the media is stacked exposing the thinnest edge of the recorded media container to the users' line of sight. This method is a convenient means for stacking the media while using a minimum amount of space; however, it is inconvenient for the user since the thinnest side of the labeled media container is exposed for searching purposes.

Other types of media storage units that expose the front side of the labeled media container are inefficient, because only one side of the storage unit is used to store the media, limiting the storage capacity of the storage unit.

U.S. Pat. No. 5,078,270 to Campbell discloses a wall mounted CD storage matrix wherein CDs may be stored vertically; however, only one side of the matrix is used for storage. A cover flap is used to protect the CD from dust and sunlight.

What is needed is a modular storage unit that is easy to store, has a larger storage capacity relative to the prior art, and is capable of being customized based on a particular user's storage requirements.

DISCLOSURE OF THE INVENTION

The object of the present invention is to provide a user friendly, high capacity storage unit for recorded media allowing easy access and relatively quick visual identification to the recording media, wherein the storage unit may be assembled from components comprising a series of media storage rows.

According to the present invention, the storage rows have means for attaching a plurality of the storage rows resulting in a matrix storage unit. The storage unit has means for hanging the unit so that the storage unit may be stored in any common closet area, protecting the recorded media from detrimental environmental elements such as light, dirt, and dust. The storage rows have two opposing ledges supported by a main beam so that media may be stored on a first side and a second side of the storage unit.

The media is positively retained in the storage rows with the front face of the media container facing the exterior of the storage unit for easy identification and user selection.

As the user's media storage requirements increase, more media storage rows may be added to the matrix storage unit. The media that is stored in the storage rows are positively retained by a hook and a lever. When the user lifts the lever, an ejector dislodges the media for easy access to the user.

The dual matrix storage doubles the storage capacity of the one sided storage capacity of the prior art and allows the user to see the front face of the original media container for easy selection, access, removal, and replacement.

The foregoing and other features and advantages of the present invention will become more apparent from the following description and accompanying drawings.

BEST MODE FOR CARRYING OUT THE PRESENT INVENTION

Figure 1:
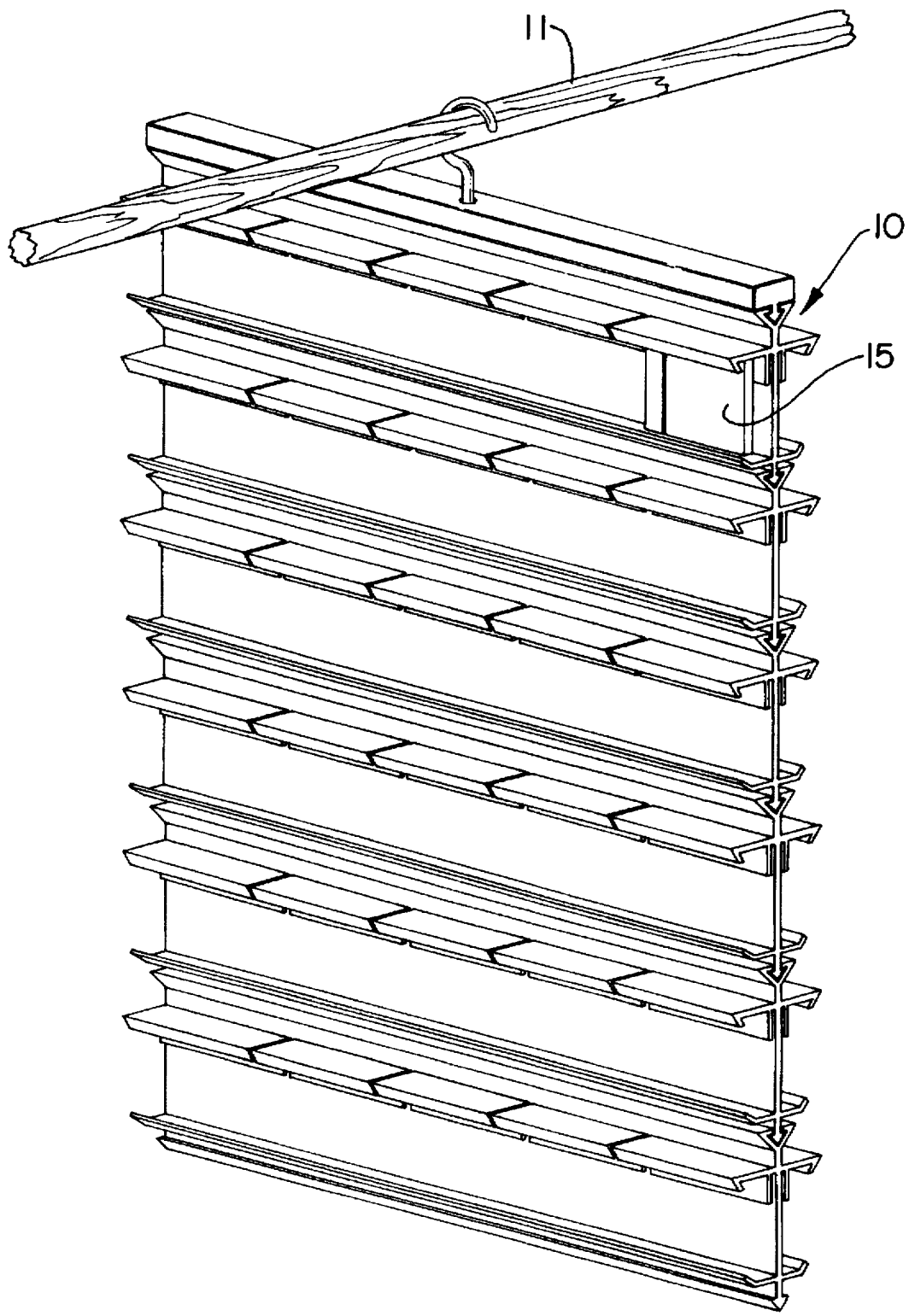
FIG. 1 is a perspective view of the present invention.

According to the present invention, and as shown in FIG. 1 a dual matrix media storage unit 10 is provided for storing recorded media 15. The storage unit 10 may be displayed or stored by hanging the storage unit 10 on a typical cross member 11 that may be located in a closet area.

Figure 2:
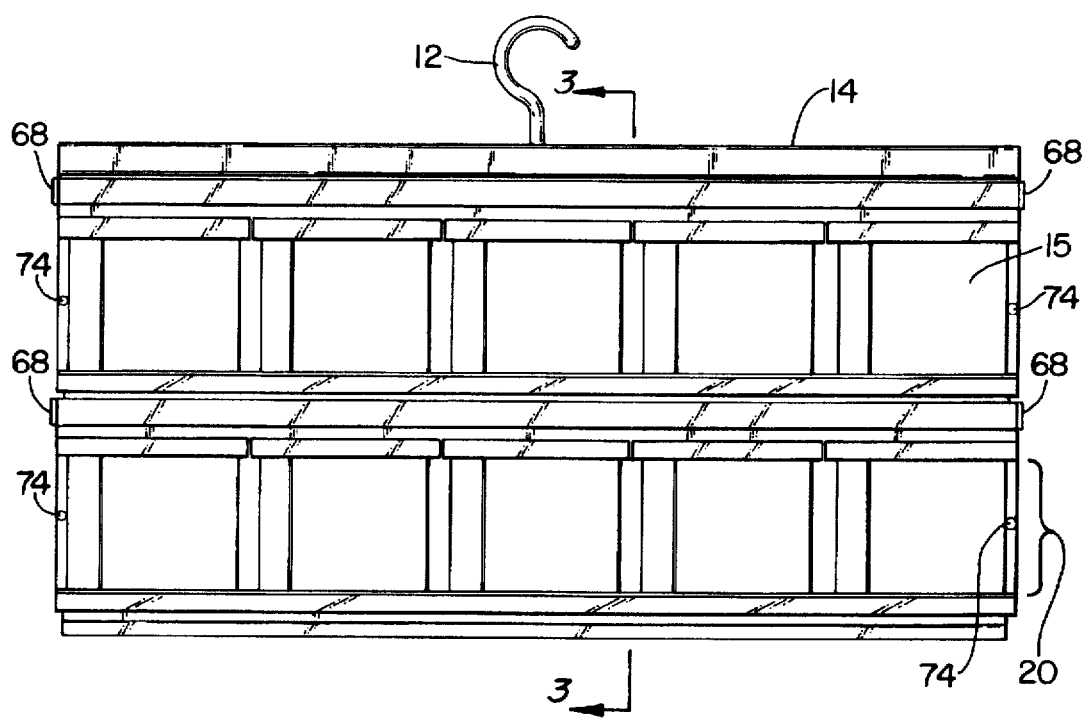
FIG. 2 is a front elevational view of the present invention showing two storage rows.
Figure 3:
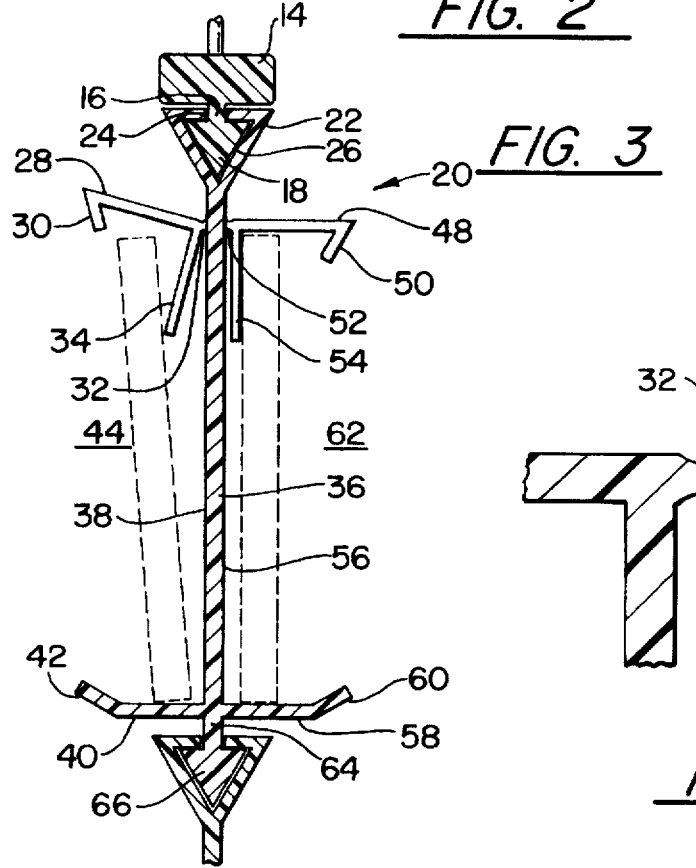
FIG. 3 is a cross-sectional view of the present invention taken alone line 3—3 in FIG. 2.

As shown in FIG. 2, the storage unit 10 has a horizontal support beam 14 and means for hanging, or hook member 12. As shown in FIG. 3, a support beam extension 16 extends vertically from the support beam 14 and an internal beam 18 extends from the support beam extension 16.

A media storage row 20 comprises an external beam 22 having an external beam opening 24 and an external beam cavity 26. The internal beam 18 is interfitting with and attached to the external beam 22 and is housed in the external beamcavity 26. The external beam opening 24 interfits with the support beam extension 16. The media storage row 20 has a main beam 36 extending vertically from the external beam 22. The main beam 36 has a first wall surface 38 and a second wall surface 56.

Extending perpendicularly from the main beam first wall 38 is a plurality of first levers 28 (shown in the open position), spaced apart so that there is one lever for each stored medium 15. Traversely extending from each first lever 28 at an acute angle is a first hook 30. Perpendicularly extending from each first lever 28 is a first ejector 34. A first hinge 32 is located adjacent to each first lever 28 between the first ejector 34 and the main beam first wall surface 38.

A first ledge 40 is located vertically from and parallel to the first levers 28 extending perpendicularly from the main beam first wall 38. Extending from the first ledge 40 at an obtuse angle is a first lip 42.

The plurality of first levers 28, the first ledge 40, and the main beam first wall surface 38 define a first storage area 44 for storing typical recorded media 15, or media 15, in a longitudinal position exposing the front label of the recorded media, if desired, providing relatively easy media identification for the user. A plurality of first levers, hinges, and ejectors may be aligned along the main beam 36 providing a storage area for each individual medium.

An individual medium 15 may be stored and removed from the first storage area 44 by lifting the first lever 28, which pivots about the first hinge 32 and, in turn, the first ejector 34 dislodges the individual medium 15 out and away from the first storage area 44. When the user replaces the medium 15 into the appropriate first storage area 44, the medium 15 rests on the first ledge 40 and the user pushes the medium 15 into the first storage area 44, forcing the medium 15 to push the appropriate first ejector 34 and, in turn, the appropriate first lever 28 into their original position, wherein the first ejector 34 is parallel to the main beam first wall surface 38 and the first lever 28 is perpendicular to the main beam first wall surface 38. The medium 15 then rests against the appropriate first hook 30 and is positively retained until the medium 15 is removed again by the user.

The first storage area 44, as described above, is located at the main beam first wall surface 38 side. A symmetrical second storage area 62 on the opposite, or main beam second wall 56 side, doubles the storage capacity of the media storage row 20. The second storage area 62 comprises a plurality of second levers 48, each having a second hook 50, a second hinge 52, and a second ejector 54. The second storage area 62 also has a second ledge 58 and a second lip 60. All of the components of the second storage area 62 have the same geometric relationship to each other and the main beam 36 as the components of the first storage area 44, but are located symmetrically on the main beam second wall surface 56. A plurality of second levers, hinges, and ejectors may be aligned along the main beam 36 providing a storage area for each individual medium.

Vertically extending from the media storage row 20 is a media storage row extension 64. Vertically extending from the media storage row extension 64 is media storage internal beam 66. The media storage internal beam 66 has a similar configuration as the internal beam 18 located on the support beam extension 16, allowing a plurality of media storage rows 20 to be interfitted with and attached together forming a matrix. The ability to easily configure the storage unit 10 by adding additional media storage rows 20 allows the user to customize the storage unit 10 to the user's storage requirements; adding or deleting media storage rows as needed.

The hook 12 allows the user to store media in a closet area in a vertical fashion; minimizing storage space and protecting the media from detrimental elements such as dirt, dust, and natural or artificial light. Additionally, the media storage rows 20 are attached vertically relative to each other allowing the user to store a large amount of media in a closet area with the media labels exposed for easy identification by the user.

Figure 4:
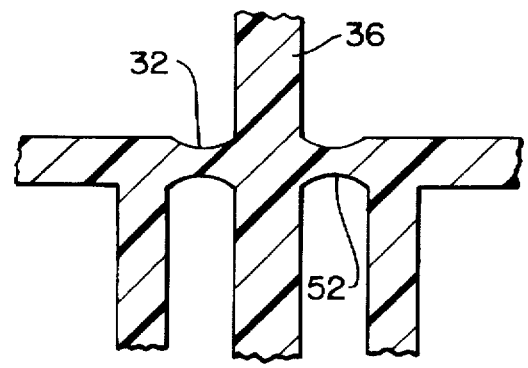
FIG. 4 is an enlarged broken away view of the hinge portion of the present invention.

As shown in FIG. 4, the first and second hinges 32 and 52 may incorporate a flexible pivot known as a live hinge, where the material thins to allow flexure. The engineering characteristics of this live hinge are primarily due to material and geometric constraints. Therefore, the hinges 32 and 52 may be tailored to allow easy access to the stored media 15 while insuring enough pivot resistance to prevent accidental release of the media 15. The outward force generated by the first ejector 34 is a consequence of the elasticity of the material, preferably a polymer, that the storage unit 10 is made of.

The storage unit 10 may be made from a resilient polymer material. The use of an extruded polymer allows for low cost manufacturing of the present invention.

Figure 5:
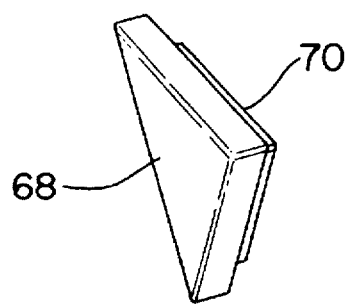
FIG. 5 is an end cap of the present invention.

As shown in FIG. 5, an end cap 68 that has a plug 70 may be positioned at each of the ends of the external beams 22 where the plug 70 fits inside the external beam cavity 26. The end caps 68 prevent movement of the external beam 22 relative to the internal beam 18 or the external beam 22 and the adjacent media storage internal beam 66.

Although an end cap 68 is described above, any means to restrict movement between the media storage rows 20 and the support beam 14 may be used. For example, the external beams 22 may be of sufficient length to allow thermal deformation of the external beam 22 to prevent movement between the external beams 22 and the internal beam 18 and the media storage internal beams 66 and 18.

Figure 6:
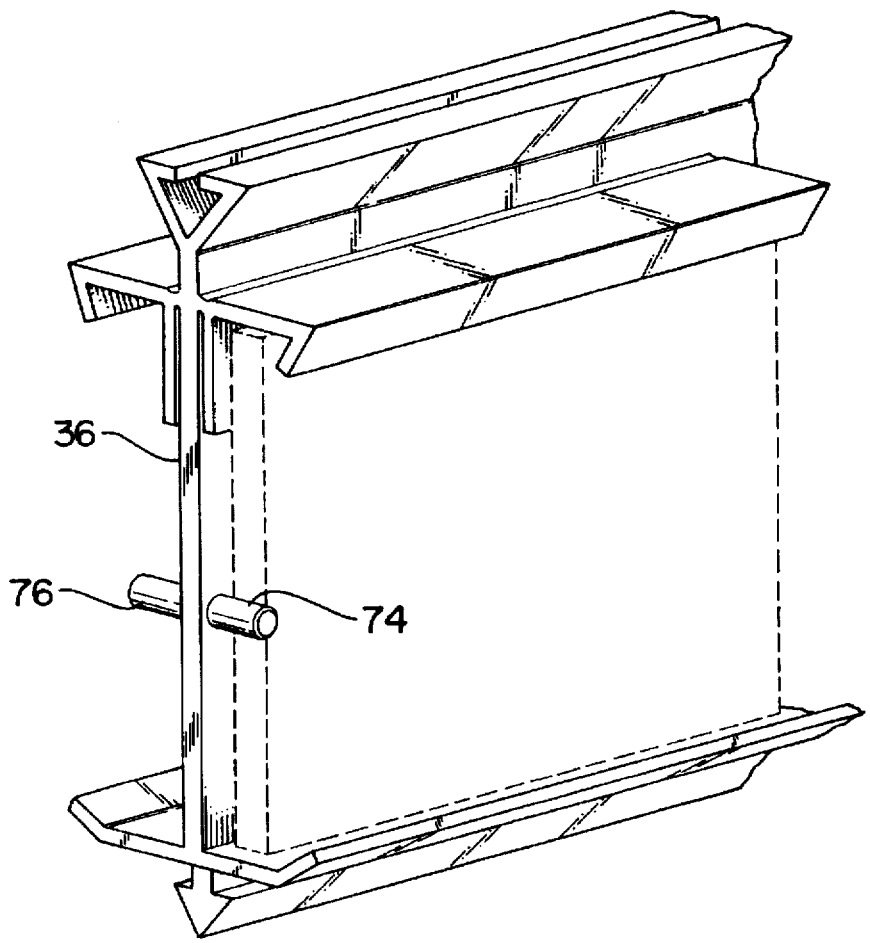
FIG. 6 is a perspective view of the present invention showing a stop pin.

Referring to FIG. 6, the main beam 36 may have an opening 74 and a pin 76 extending through the opening 74. The pin 76 would restrict movement of the media 15 from sliding off of the media storage row 20. A pin 76 may be placed near the ends of each main beam 36 or, in the alternative, may be between each medium 15 with sufficient distance between the pins 76 to restrict the movement of each medium 15 to its respective storage area 44 or 62. Any means for restricting the medium to its respective storage area may be used, for example, clips or molded stops may be used instead of inserted pins as described here.

Figure 8:
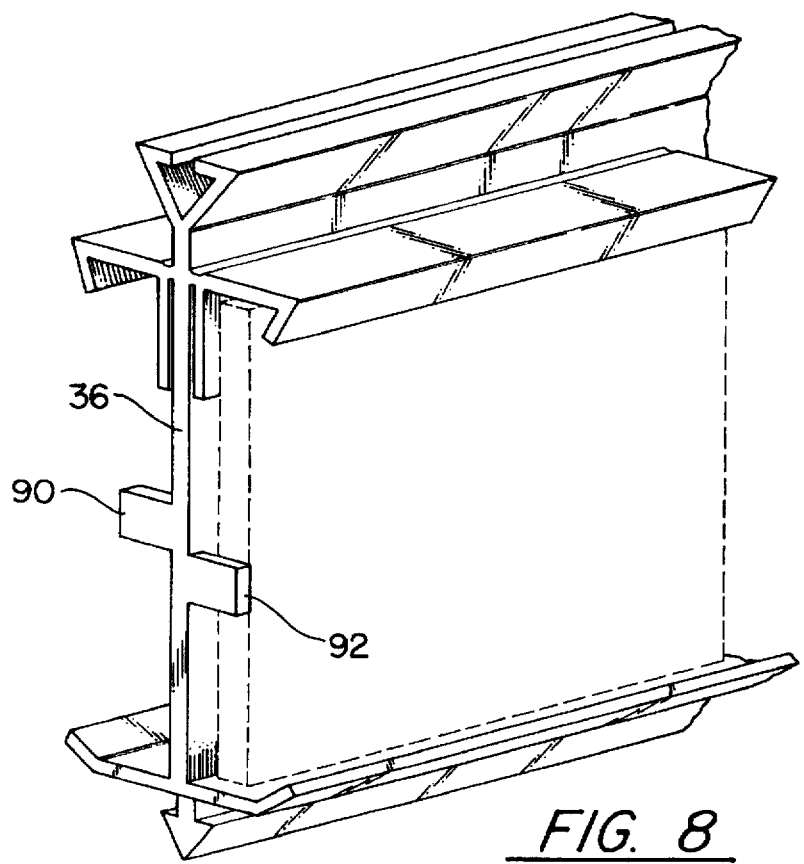
FIG. 8 is a perspective view of a separate embodiment of the present invention showing a stop wall.

For example, as shown in FIG. 8, the main beam 36 may be deformed to create a first stop wall 90 and a second stop wall 92. The walls be deformed from the main beam 36 so that the first wall 90 extends perpendicularly to the first storage area 44, and so that the second stop wall 92 extends perpendicularly to the second storage area 62.

Figure 7:
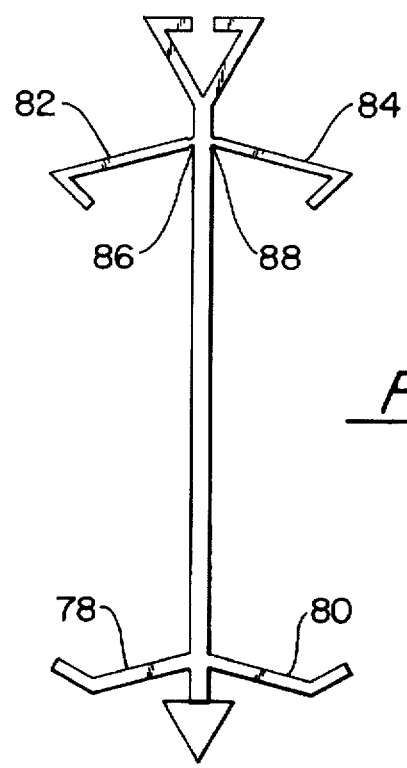
FIG. 7 is a cross-sectional view similar to FIG. 3 of a separate embodiment of the present invention.

A second embodiment of the present invention is shown in FIG. 7 and is identical to the preferred embodiment except that this embodiment incorporates the following differences in its design.

The first and second ledges 78 and 80 are angled downward so as to achieve a natural tipping action of the media 15. The first and second levers 82 and 84 still rotate about a first and second hinge 86 and 88 respectively. In this embodiment, there is no need for a first and second ejector since the angled orientation of the media predisposes it to eject by falling out of the storage unit when the lever releases the medium.

Although this invention has been shown and described with respect to a detailed embodiment thereof, it will be understood by those skilled in the art that various changes in form and detail thereof may be made without departing from the spirit and scope of the claimed invention.

We claim:

1. A storage unit for storing recorded media, comprising:
    a horizontal support beam having means for hanging the unit and means for interfitting an additional component vertically;
    at least one storage row having means for storing the recorded media, the storage row having means for interfitting with the support beam so that the storage row interfits with and attaches to the support beam, the storage row also having means for interfitting additional components vertically so that additional storage rows may be attached vertically;
    at least one lever adapted to positively retain the stored recorded media in the storage rows.

2. The storage unit of claim 1, wherein the support beam and the storage row means for interfitting an additional component vertically comprises:
    a support beam extension extending vertically from the support beam;
    an internal beam extending from the support beam extension;
    a storage row external beam having an external beam opening and an external beam cavity;
    the internal beam interfitting with and attaching to the external beam in the external beam cavity;
    the external beam opening interfitting with the support beam extension.

3. The storage unit of claim 2, wherein the storage row further comprises a media storage internal beam extending from a storage row extension so that additional storage rows may be assembled to the storage unit.

4. The storage unit of claim 1, wherein the means for positively retaining the stored recorded media in the storage rows further comprises:

a plurality of levers extending from the storage rows, the levers having a hook extending from each lever at an acute angle, the levers being spaced apart so that there is one lever for each stored medium.

5. The storage unit of claim 4, wherein each lever further comprises:

an ejector extending perpendicularly from each lever and a hinge located at each lever adjacent to the storage rows.

6. The storage unit of claim 1, wherein the storage rows further comprise:

a ledge extending perpendicularly from the storage rows and parallel to the levers;

a lip extending at an obtuse angle from the ledge;

the levers and the ledge define the storage area for the recorded media.

7. The storage unit of claim 1, further comprising:

at least one second storage row being symmetrical to the first storage row, the second storage row being opposite of the first storage row, so that the recorded media may be stored on both sides of the storage unit.

8. The storage unit of claim 4, wherein each of the levers further comprise a hinge where the material thins to allow flexure of the lever.

9. The storage unit of claim 3, further comprising means to prevent movement of the internal beam, the external beam, and the media storage internal beam relative to each other.

10. The storage unit of claim 6, wherein the ledges are angled downward so as to achieve a natural tipping action of the media when the lever is lifted from the media.

11. A storage unit for storing recorded media, comprising:

a support beam having a hook member for hanging the unit;

a support beam extension extending vertically from the support beam;

and an internal beam extending from the support beam extension;

a media storage row having an external beam with an external beam opening and an external beam cavity, the internal beam being interfitted with the external beam and housed in the external beam cavity, the media storage row having a main beam, a plurality of first levers extending perpendicularly from the main beam;

each first lever having a first hook extending from each first lever at an acute angle, a first ejector extending perpendicularly from each first lever, a first hinge located in each first lever adjacent to the main beam;

a first ledge extending perpendicularly from the main beam and parallel to the first levers, a first lip extending at an obtuse angle from the first ledge;

the first lever, the first ledge and the main beam defining a first storage area, so that individual recorded media may be stored and removed in the first storage area;

the media storage row also having a media storage row extension extending from the first ledge and a media storage internal beam adjacent to the media storage row extension, so that a series of media storage rows may be in attached with each other.

12. The storage unit of claim 11, wherein the media storage rows further comprise a plurality of second levers extending perpendicularly from the main beam and opposite from the first levers, each second lever having a second hook extending traversely from each second lever, a second ejector extending perpendicularly from each second lever, a second hinge in each second lever adjacent to the main beam;

a second ledge extending perpendicularly from the main beam, parallel with the second levers, and opposite from the first ledge, a second lip extending at an acute angle from the second ledge;

the second lever, the second ledge and the main beam defining a second storage area opposite of the first storage area, so that individual recorded media may be stored and removed in the first and second storage areas.

13. The storage unit of claim 11, wherein the main beam further comprises a means for restricting horizontal movement of stored recorded media.

14. The storage unit of claim 12, wherein the main beam further comprises an opening and a pin extending through the opening at each end of the main beam for restricting horizontal movement of the stored recorded media.

15. The storage unit of claim 12, wherein the media storage row further comprises an end cap having a plug so that the plug fits inside the external beam cavity to prevent movement of the external beam relative to the internal beam and the adjacent media storage internal beam.

16. The storage unit of the claim 12, wherein the external beam is deformed for restricting movement of the external beam relative to the internal beam and the adjacent media storage internal beam.

17. The storage unit of claim 12, wherein the first and second ledges are angled downward so as to achieve a natural tipping action of the media when the lever is lifted from the media.

* * * * *